(12) United States Patent
Ok et al.

(10) Patent No.: US 8,189,909 B2
(45) Date of Patent: May 29, 2012

(54) COLOR TEMPERATURE CONVERSION METHOD AND APPARATUS HAVING LUMINANCE CORRECTION CONVERSION FUNCTION

(75) Inventors: Hyun-wook Ok, Goyang-si (KR); Du-sik Park, Suwon-si (KR); Chang-yeong Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1580 days.

(21) Appl. No.: 11/543,124

(22) Filed: Oct. 5, 2006

(65) Prior Publication Data
US 2007/0081720 A1 Apr. 12, 2007

(30) Foreign Application Priority Data
Oct. 10, 2005 (KR) .......................... 10-2005-0095081

(51) Int. Cl.
*G06K 9/00* (2006.01)
(52) U.S. Cl. ....................................... 382/167; 382/162
(58) Field of Classification Search .................... 382/162
See application file for complete search history.

(56) References Cited

U.S. PATENT DOCUMENTS

| | | | | |
|---|---|---|---|---|
| 2005/0195211 A1* | 9/2005 | Park et al. | ...................... | 345/600 |
| 2005/0219259 A1* | 10/2005 | Gonsalves et al. | ............ | 345/593 |
| 2005/0276470 A1* | 12/2005 | Kim et al. | ...................... | 382/162 |
| 2006/0188156 A1* | 8/2006 | Kwak et al. | .................... | 382/167 |
| 2009/0109293 A1* | 4/2009 | Coley et al. | .................... | 348/181 |

FOREIGN PATENT DOCUMENTS

| | | |
|---|---|---|
| JP | 2003-047020 A | 2/2003 |
| KR | 10-2002-0079348 A | 10/2002 |
| KR | 10-2003-0031673 A | 4/2003 |
| KR | 10-2005-0052896 A | 6/2005 |
| KR | 10-2005-0087266 A | 8/2005 |

OTHER PUBLICATIONS

Office Action dated Jun. 20, 2011 from the Korean Intellectual Property Office in counterpart Korean application No. 10-2005-0095081.

* cited by examiner

*Primary Examiner* — Bhavesh Mehta
*Assistant Examiner* — Nirav G Patel
(74) *Attorney, Agent, or Firm* — Sughrue Mion, PLLC

(57) ABSTRACT

A color temperature conversion method and apparatus having a luminance correction conversion function are provided. The color temperature conversion method controls a color temperature of an image display device. In the color temperature conversion method, a user-set color temperature is compared with a pre-stored basic color temperature for each sample luminance, thus converting a color temperature of an input pixel. A luminance scale factor corresponding to the user-set color temperature is calculated with respect to the converted input pixel, and a luminance correction conversion function is performed using the calculated luminance scale factor. Accordingly, a color temperature conversion method and apparatus having a luminance correction conversion function corrects luminance using a preset luminance scale factor, thus preventing distorted gray scale representation that may occur in the conversion and correction of color temperature.

19 Claims, 9 Drawing Sheets

ORIGINAL IMAGE

| 255,255,255 | 250,250,250 | 245,245,245 | 240,240,240 |
|---|---|---|---|

EXAMPLE OF CHROMATICITY COORDINATES REQUIRED TO REPRODUCE 9000K ON MONITOR HAVING BASIC COLOR TEMPERATURE OF 7000K, AND RGB VALUES CORRESPONDING THERETO

| INPUT RGB DATA | Index | CHROMATICITY COORDINATES REQUIRED TO REPRODUCE TARGET COLOR TEMPERATURE | NORMALIZED RGB CORRESPONDING TO LUT |
|---|---|---|---|
| (255, 255, 255) : 210cd/m² | 255 | (13.18, -4.50) | (227, 231, 255) |
| (240, 240, 240) : 186cd/m² | 240 | (12.45, -4.50) | (227, 231, 255) |

PROCESSING USING CONVENTIONAL METHOD

| 227,231,255 | 227,231,255 | 227,231,255 | 227,231,255 |
|---|---|---|---|

EXAMPLE OF CHROMATICITY COORDINATES REQUIRED TO REPRODUCE 9000K ON MONITOR HAVING BASIC COLOR TEMPERATURE OF 7000K, and IMPROVED RGB VALUES CORRESPONDING THERETO

| INPUT RGB DATA | Index | CHROMATICITY COORDINATES REQUIRED TO REPRODUCE TARGET COLOR TEMPERATURE | NORMALIZED RGB CORRESPONDING TO LUT |
|---|---|---|---|
| (255, 255, 255) : 210cd/m² | 255 | (13.18, -4.50) | (226, 230, 255) |
| (240, 240, 240) : 186cd/m² | 240 | (12.45, -4.50) | (215, 219, 243) |

PROCESSING USING PROPOSED METHOD

| 226,230,255 | 224,228,253 | 220,224,248 | 215,219,243 |
|---|---|---|---|

COLOR TEMPERATURE CONVERSION METHOD AND APPARATUS HAVING LUMINANCE CORRECTION CONVERSION FUNCTION

CROSS-REFERENCE TO RELATED APPLICATION

This application claims priority from Korean Patent Application No. 10-2005-0095081 filed on Oct. 10, 2005 in the Korean Intellectual Property Office, the disclosure of which is incorporated herein by reference in its entirety.

BACKGROUND OF THE INVENTION

1. Field of the Invention

Methods and apparatuses consistent with the present invention relate to color temperature conversion and, more particularly, to color temperature conversion having a luminance correction conversion function, which can represent the gray scale of luminance, occurring when the difference between the color temperature of an image display device and a user-set color temperature is large in the case where the color temperature of an image is converted and corrected to correspond to the user-set color temperature in the image display device.

2. Description of the Related Art

The complete set of hues experienced by a person viewing a scene varies according to the lighting characteristics. For example, under incandescent light, hues are colored red overall, and, under sunlight, hues are colored blue compared to under incandescent light. That is, if a color temperature is high, hues are biased towards blue, whereas, if the color temperature is low, hues are biased towards red. In this case, when hues are related overall to color temperature, the color temperature must be changed so as to change the hues. The term "color temperature" denotes the temperature of light caused by perfect thermal radiation, and is measured in kelvin (K).

A color display system has been widely used in appliances for visually providing information to a user, such as a television (TV), a digital TV (DTV), a thin film transistor (TFT) monitor, a color printer, a digital camera, a projector, or a mobile phone. Owing to the visual characteristics of the color display system, there is a need to precisely calculate the correlated color temperature. The correlated color temperature of light sources denotes the temperature of a blackbody radiator appearing when the light sources have the same color, and is also measured in kelvin. That is, the correlated color temperature represents the wavelength of a light source on the kelvin scale, which is the standard for comparative measurements.

Color models are used to classify colors according to attributes, such as hue, saturation, chroma, lightness and brightness, and specify the classified colors. Color models include a Red, Green, Blue (RGB) model, a Hue Saturation Value (HSV)/Hue Lightness Saturation (HLS) model, a Munsell color system, an International Commission on Illumination (CIE) color model, etc. The CIE color model was defined by the International Commission on Illumination (CIE) for establishing standards for illuminators. A CIE color model includes a CIE_XYZ color model, a CIE_LUV color model and a CIE_LAB color model. The CIE_XYZ color model represents RGB tristimulus values as an XYZ, which is a set of different tristimulus values, each having a positive polarity. The CIE_XYZ color model uses a chromaticity diagram.

Meanwhile, a related art image display device converts the color temperature of an image reproduced on an image display device by adjusting the hue or the amount of RGB or by performing a matrix operation. Such a related art color temperature conversion method influences the entire content of a reproduced image. This method is problematic in that, if the difference between the target color temperature of an image to be reproduced and the basic color temperature of the device is large, a phenomenon in which the image, obtained after conversion, seems to have been passed through a specific color filter, occurs, and the naturalness of the reproduced image is deteriorated due to the degradation of color in faces, easily perceived by persons.

Figure 1:
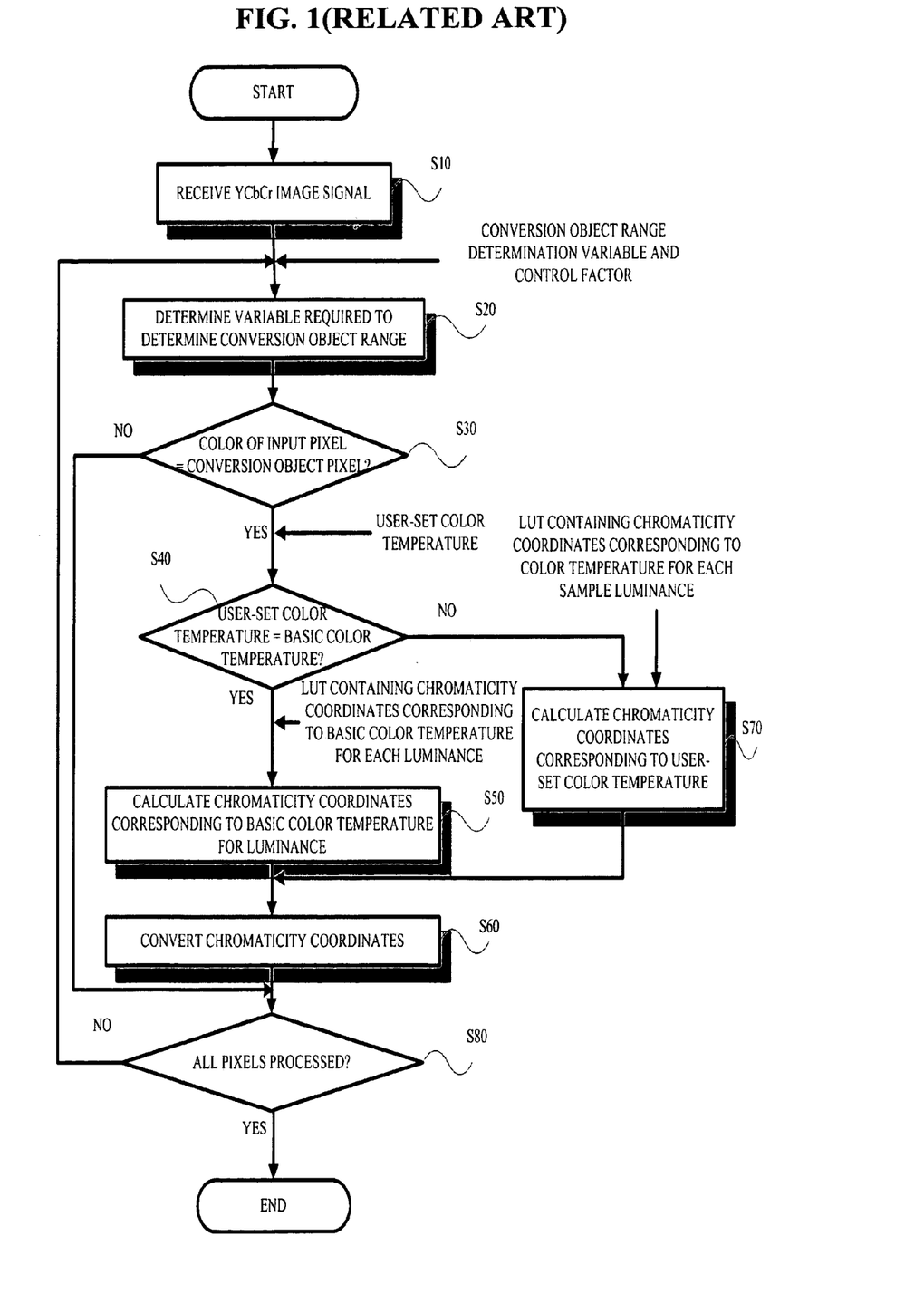
FIG. 1 is a flowchart showing a related art color temperature conversion method having a correction function according to the luminance of an image pixel.

A related art for solving this problem is a "color temperature conversion method and apparatus having a correction function according to the luminance of an image pixel" disclosed in Korean Patent Laid-Open Publication No. 10-2005-0087266, previously filed by the applicant of the present invention. FIG. 1 is a flowchart illustrating this related color temperature conversion method having a correction function according to the luminance of an image pixel.

The related art color temperature conversion method and apparatus convert a current color temperature into a color temperature other than a color temperature provided by an image reproduction device, or reproduce different color temperatures for respective luminance values of input pixels in consideration of users' preferences. With reference to FIG. 1, the related art color temperature conversion method is described. First, if a YCbCr image signal is received at operation S10, a variable for determining the conversion object range, which is a quadratic curve, is determined at operation S20. Further, whether an input pixel is a conversion object is determined by determining whether an input pixel exists within the conversion object range based on the determination variable at operation S30. If it is determined that the input pixel is a conversion object, a user-set color temperature is received, and is compared to the basic color temperature at operation S40. If the user-set color temperature is different from the basic color temperature as a result of the comparison, conversion target chromaticity coordinates corresponding to the user-set color temperature are calculated with reference to a Look-Up Table (LUT) containing chromaticity coordinates corresponding to a color temperature for each sample luminance at operation S70. If the user-set color temperature is equal to the basic color temperature, conversion target chromaticity coordinates corresponding to the basic color temperature are calculated with reference to an LUT containing basic color temperature coordinates for each luminance at operation S50. Further, the chromaticity coordinate conversion operation, of converting the chromaticity coordinates of the input pixel to correspond to the extent to which an origin on a chromaticity coordinate plane is moved to the conversion target chromaticity coordinates, is performed at operation S60. Finally, it is determined whether all pixels have been processed at operation S80. If it is determined that any pixel remains to be processed, the process returns to operation S20, whereas, if it is determined that there are no remaining pixels, the process is terminated.

The related art method and apparatus selectively perform color temperature conversion and correction with respect only to a gray region in a color space. Therefore, even when the difference between the basic color temperature of the device and the user-set color temperature is large, degradation of other colors does not occur, and color temperature conversion is performed for each luminance. Accordingly, color temperature control for each luminance to satisfy a user's preference is possible, and the capability of reproducing a gray color is improved.

Figure 2:
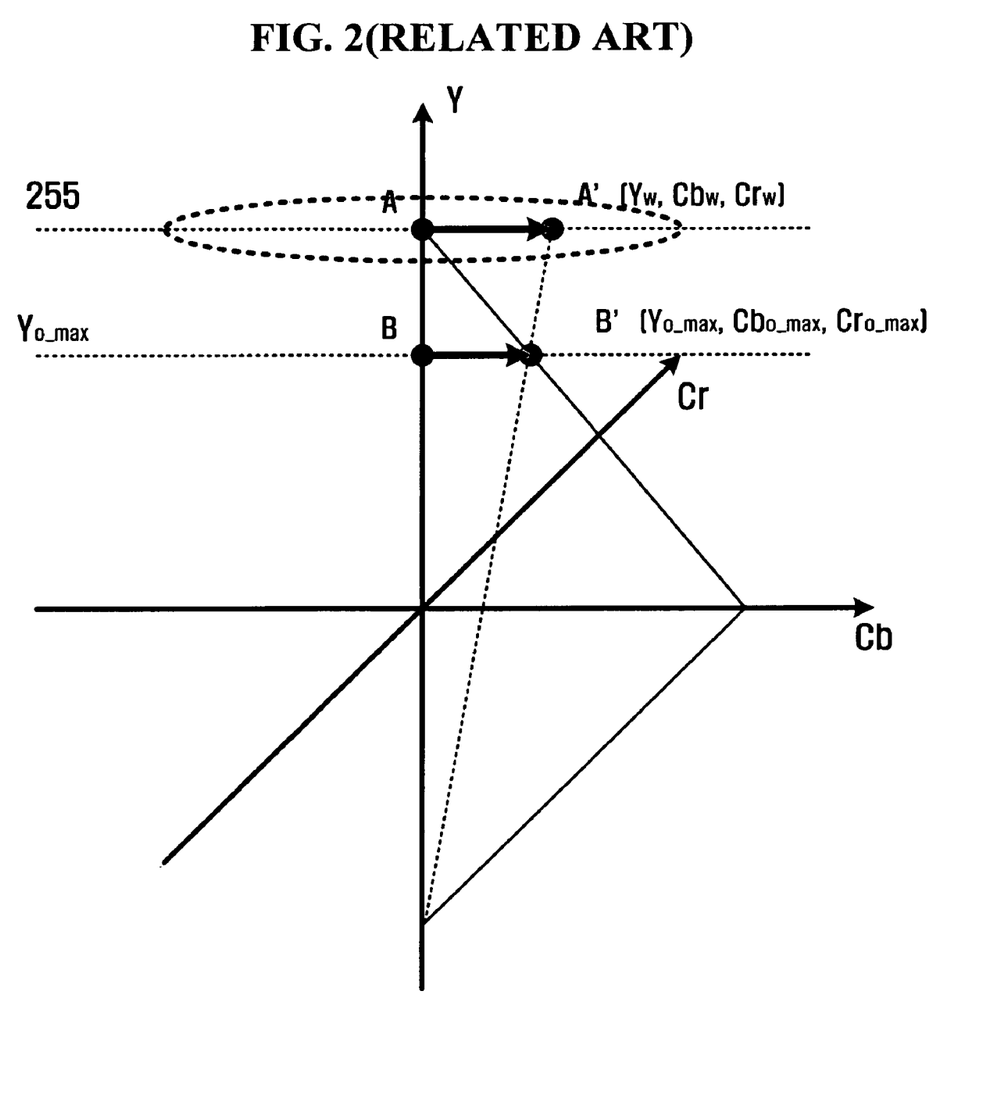
FIG. 2 is a diagram showing the case where a point placed outside a YCbCr color space is mapped to a point placed inside the color space according to the color temperature conversion method of FIG. 1.

However, when the difference between the color temperature of an image display device and the user-set color temperature is large, the difference between the luminance values of a selected gray region and the remaining regions increases, thus causing a problem related to gray scale representation in that pixels having different luminance values in an input image are represented by the same luminance in an output image. Such a problem related to gray scale representation is shown in FIG. 2. FIG. 2 illustrates the case where a point placed outside a YCbCr color space is mapped to a point placed inside the color space according to the color temperature conversion method of FIG. 1. Referring to FIG. 2, when a certain color temperature is converted into a user-set color temperature in a gray region, given points A and B are moved to A' and B', respectively. In this case, the point A' exists outside the color space, and thus the color of the point A' cannot be represented. Accordingly, in the prior art, a method of resealing colors, which exist outside the color space after color temperature conversion has been performed, on the basis of maximum values in an RGB color space, and mapping the rescaled colors to colors that exist inside the color space, is used. This operation is expressed by the following Equation 1.

If $Max(R,G,B) > 255$, $R' = R/Max(R,G,B)*255$ $G' = G/Max(R,G,B)*255$ $B' = B/Max(R,G,B)*255$ \hfill (1)

However, such a related art method is problematic in that, when original colors placed on an A-B line are converted into colors placed on an A'-B' line through color temperature conversion, all points on the A-B line are mapped to the single point B' existing in the color space, as shown in FIG. 2, so that distortion occurs in the representation of gray scale values corresponding to luminance. That is, there is a problem in that colors, originally having different luminance values, are converted into a common point having the same luminance after color temperature conversion has been performed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a color temperature conversion method and apparatus having a luminance correction conversion function, which correct luminance using a preset luminance scale factor (LSF) to prevent distorted gray scale representation that may occur when color temperature is converted and corrected.

In accordance with one aspect of the present invention, there is provided a color temperature conversion method having a luminance correction conversion function, in which the color temperature of an image display device can be controlled. The method includes comparing a user-set color temperature with a pre-stored basic color temperature for each sample luminance, thus converting a color temperature of an input pixel; and calculating a luminance scale factor corresponding to the user-set color temperature with respect to the converted input pixel, and performing a luminance correction conversion function using the calculated luminance scale factor.

In accordance with another aspect of the present invention, there is provided a color temperature conversion method having a luminance correction conversion function. The method includes comparing a user-set color temperature with a pre-stored basic color temperature for each sample luminance, thus converting a color temperature of an input pixel; calculating a luminance scale factor corresponding to the user-set color temperature with respect to the input pixel, and performing a luminance correction conversion function using the calculated luminance scale factor; and combining chromaticity coordinates of the input pixel, the color temperature of which is converted, and the input pixel, the luminance of which is corrected and converted, with each other, and outputting the combined chromaticity coordinates.

The luminance correction conversion function performance may include calculating a luminance scale factor corresponding to the user-set color temperature using a previously generated luminance correction look-up table; and adding a luminance of the input pixel corresponding to a region, determined to be a color temperature conversion object range, to an amount of luminance correction using the luminance scale factor, thus converting the luminance of the input pixel.

In accordance with a further aspect of the present invention, there is provided a color temperature conversion apparatus having a luminance correction conversion function, in which the color temperature of an image display device can be controlled. The apparatus includes a color temperature conversion unit comparing a user-set color temperature with a pre-stored basic color temperature for each sample luminance, thus converting a color temperature of an input pixel; and a luminance correction conversion unit calculating a luminance scale factor corresponding to the user-set color temperature with respect to the input pixel, and performing a luminance correction conversion function using the calculated luminance scale factor.

The luminance correction conversion unit may include a look-up table generation unit designating predetermined sample color temperatures and luminance scale factor values corresponding thereto, thus generating a luminance correction look-up table; a luminance scale factor calculation unit calculating a luminance scale factor corresponding to the user-set color temperature using the luminance correction look-up table; and a luminance conversion unit adding a luminance of the input pixel corresponding to a region, determined to be a color temperature conversion object range, to an amount of luminance correction using the luminance scale factor, thus converting the luminance of the input pixel.

BRIEF DESCRIPTION OF THE DRAWINGS

The above and other aspects of the present invention will be more clearly understood from the following detailed description of exemplary embodiments taken in conjunction with the accompanying drawings, in which.

DETAILED DESCRIPTION OF EXEMPLARY EMBODIMENTS OF THE INVENTION

Reference now should be made to the drawings, in which the same reference numerals are used throughout the different drawings to designate the same or similar components.

The present invention is described hereinafter with reference to flowchart illustrations, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed on the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Further, each block of the flowchart illustrations may represent a module, segment, or portion of code, which comprises one or more executable instructions for implementing the specified logical function(s). It should also be noted that, in some alternative implementations, the functions noted in the blocks may occur in a different order. For example, two blocks shown in succession may in fact be executed substantially concurrently, or the blocks may sometimes be executed in reverse order, depending upon the desired functionality.

Figure 3:
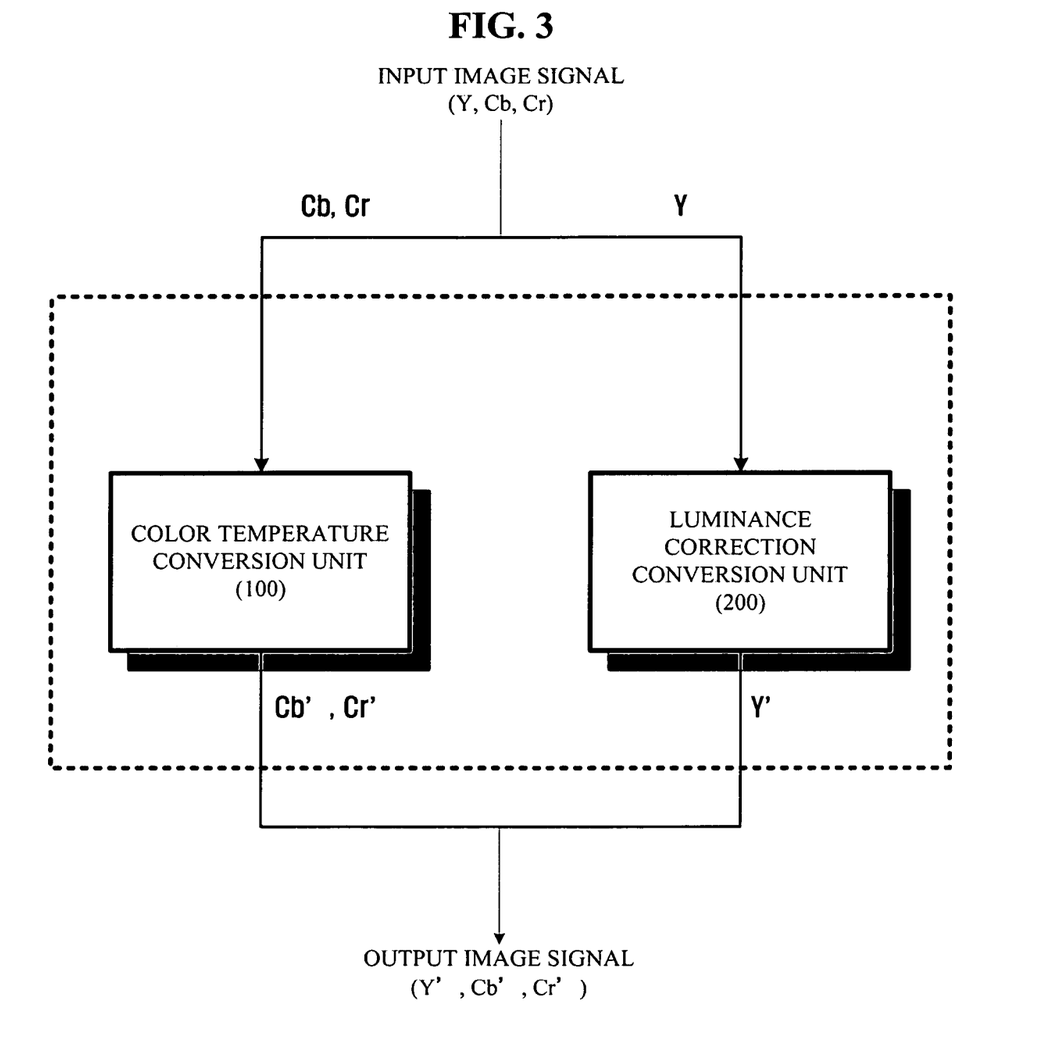
FIG. 3 is a diagram showing the construction of a color temperature conversion apparatus having a luminance correction conversion function according to an exemplary embodiment of the present invention.

FIG. 3 is a diagram showing the construction of a color temperature conversion apparatus having a luminance correction conversion function according to an exemplary embodiment of the present invention. Referring to FIG. 3, the color temperature conversion apparatus having a luminance correction conversion function includes a color temperature conversion unit 100 and a luminance correction conversion unit 200. Each of the color temperature conversion unit 100 and the luminance correction conversion unit 200 includes a look-up table functioning as a kind of storage unit.

The color temperature conversion unit 100 compares a user-set color temperature with a pre-stored basic color temperature for each sample luminance, and converts the color temperature of an input pixel.

The luminance correction conversion unit 200 calculates a luminance scale factor corresponding to the user-set color temperature with respect to the converted input pixel, and performs a luminance correction conversion function using the calculated luminance scale factor.

YCbCr will be now described in brief. YCbCr is a color representation method based on a luminance signal Y and chrominance signals Cb and Cr, not color signals. Cr is a signal obtained by digitizing an R-Y component, and Cb is a signal obtained by digitizing a B-Y component. Since the human eye is sensitive to luminance rather than colors, processing using chrominance signals is more efficient and thus is widely used. Conversion equations between RGB and YCbCr are expressed as follows in Equations 2 through 4.

$$Y = 0.29900R + 0.58700G + 0.11400B \qquad (2)$$

$$Cb = -0.16874R - 0.33126G + 0.50000B \qquad (3)$$

$$Cr = 0.50000R - 0.41869G - 0.08131B \qquad (4)$$

Referring to FIG. 3, if an input image signal composed of the luminance signal Y and the chrominance signals Cb and Cr is received, the chrominance signals Cb and Cr are converted into and output as chrominance signals Cb' and Cr' by the color temperature conversion unit 100. The luminance signal Y is converted into and output as a luminance signal Y' by the luminance correction conversion unit 200. The luminance signal Y' is combined with the chrominance signals Cb' and Cr', output from the color temperature conversion unit 100, to generate an output image signal [Y', Cb', Cr']. In this case, the color temperature conversion unit 100 and the luminance correction conversion unit 200 consult their look-up tables. The detailed procedure thereof will be described later.

Figure 4:
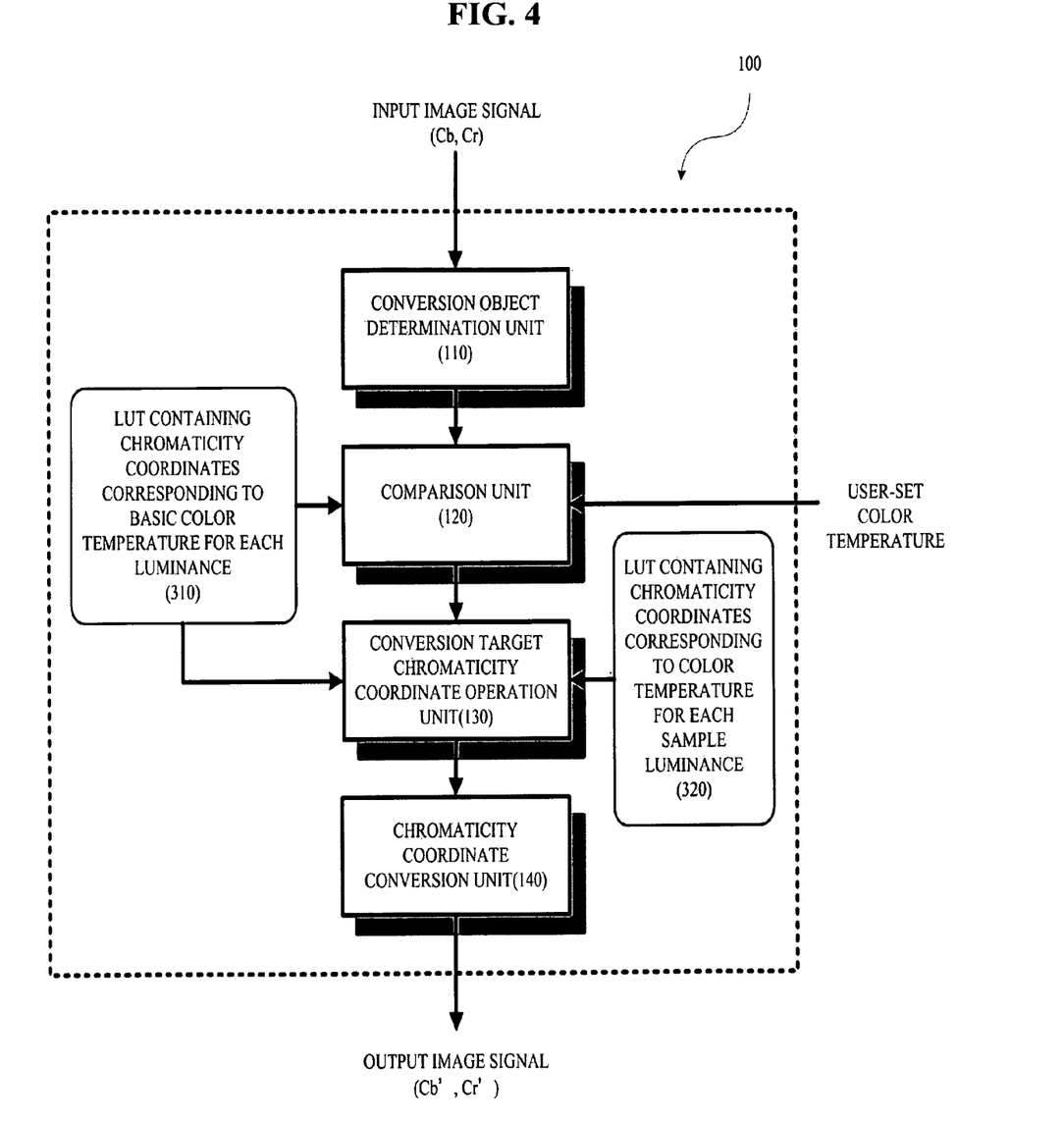
FIG. 4 is a diagram showing the color temperature conversion unit of the color temperature conversion apparatus having a luminance correction conversion function according to an exemplary embodiment of the present invention.

FIG. 4 is a diagram showing the color temperature conversion unit 100 of the color temperature conversion apparatus having a luminance correction conversion function according to an exemplary embodiment of the present invention. The color temperature conversion unit 100 includes a conversion object determination unit 110, a comparison unit 120, a conversion target chromaticity coordinate operation unit 130, and a chromaticity coordinate conversion unit 140, and further includes a Look-Up Table (LUT) 310 containing chromaticity coordinates corresponding to a basic color temperature for each luminance, and an LUT 320 containing chromaticity coordinates corresponding to a color temperature for each sample luminance.

The conversion object determination unit 110 determines whether the input pixel of the input image signal is a color temperature conversion object. That is, the conversion object determination unit 110 determines whether the input pixel is a conversion object by determining whether the input pixel exists within a conversion object range appearing in the shape of a quadratic curve.

If the input pixel is found to be a conversion object as a result of the determination of the conversion object determination unit 110, the comparison unit 120 compares a user-set color temperature with a basic color temperature for each sample luminance so as to selectively obtain conversion target chromaticity coordinates with respect to one of the user-set color temperature and the basic color temperature. In this case, the basic color temperature for each sample luminance is obtained with reference to the LUT 310 containing chromaticity coordinates corresponding to a basic color temperature for each luminance.

The conversion target chromaticity coordinate operation unit 130 performs an operation with reference to the LUT 310 containing chromaticity coordinates corresponding to a basic color temperature for each luminance, or the LUT 320 containing chromaticity coordinates corresponding to a color temperature for each sample luminance, in order to selectively obtain conversion target chromaticity coordinates with respect to any one of the user-set color temperature and the basic color temperature, based on the comparison results of the comparison unit 120.

The chromaticity coordinate conversion unit 140 converts the chromaticity coordinates of the input pixel to correspond to the extent to which the conversion target chromaticity coordinates are moved to an origin, and then generates an output image signal having new chrominance signals Cb' and Cr'.

Figure 5:
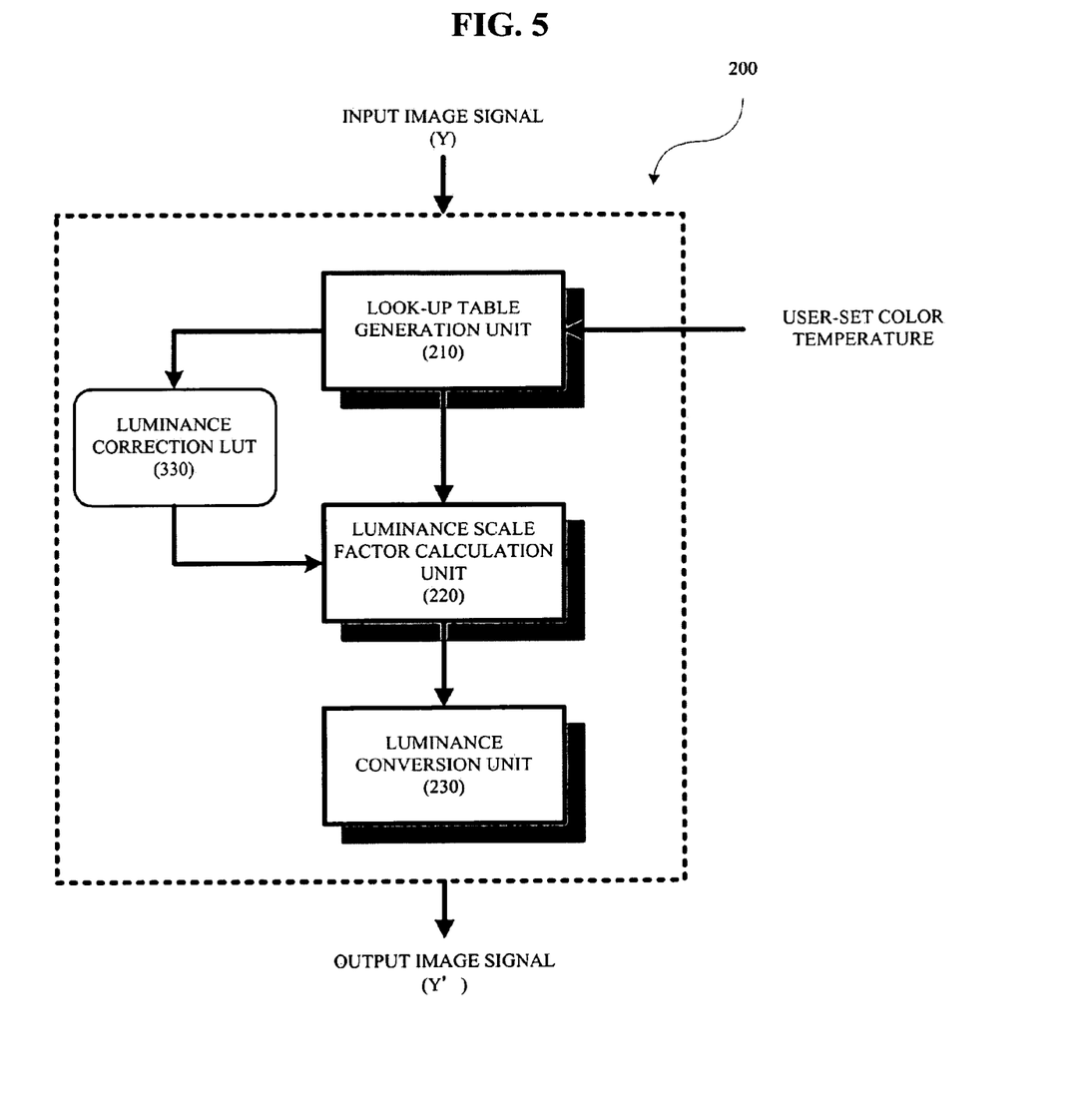
FIG. 5 is a diagram showing the luminance correction conversion unit of the color temperature conversion apparatus having a luminance correction conversion function according to an exemplary embodiment of the present invention.

Hereinafter, with reference to FIG. 5, the luminance correction conversion unit is described. FIG. 5 is a diagram showing the luminance correction conversion unit of the color temperature conversion apparatus having a luminance correction conversion function according to an exemplary embodiment of the present invention. The luminance correction conversion unit 200 includes a look-up table generation unit 210, a luminance scale factor calculation unit 220, and a luminance conversion unit 230.

The look-up table generation unit 210 generates a luminance correction look-up table 330 by designating predetermined sample color temperatures and luminance scale factor values corresponding thereto.

The luminance scale factor calculation unit 220 calculates a luminance scale factor corresponding to the user-set color temperature using the luminance correction look-up table 330.

The luminance conversion unit 230 adds the amount of luminance correction to the luminance of the input pixel corresponding to the region that is determined to be the color temperature conversion object range, using the luminance scale factor, thus converting the luminance of the input pixel.

A procedure of calculating a luminance scale factor corresponding to a user-set color temperature using the luminance correction look-up table 330, and a procedure of adding the amount of luminance correction to the luminance of an input pixel and converting the luminance of the input pixel are described with reference to FIGS. 6 to 9.

Figure 7:
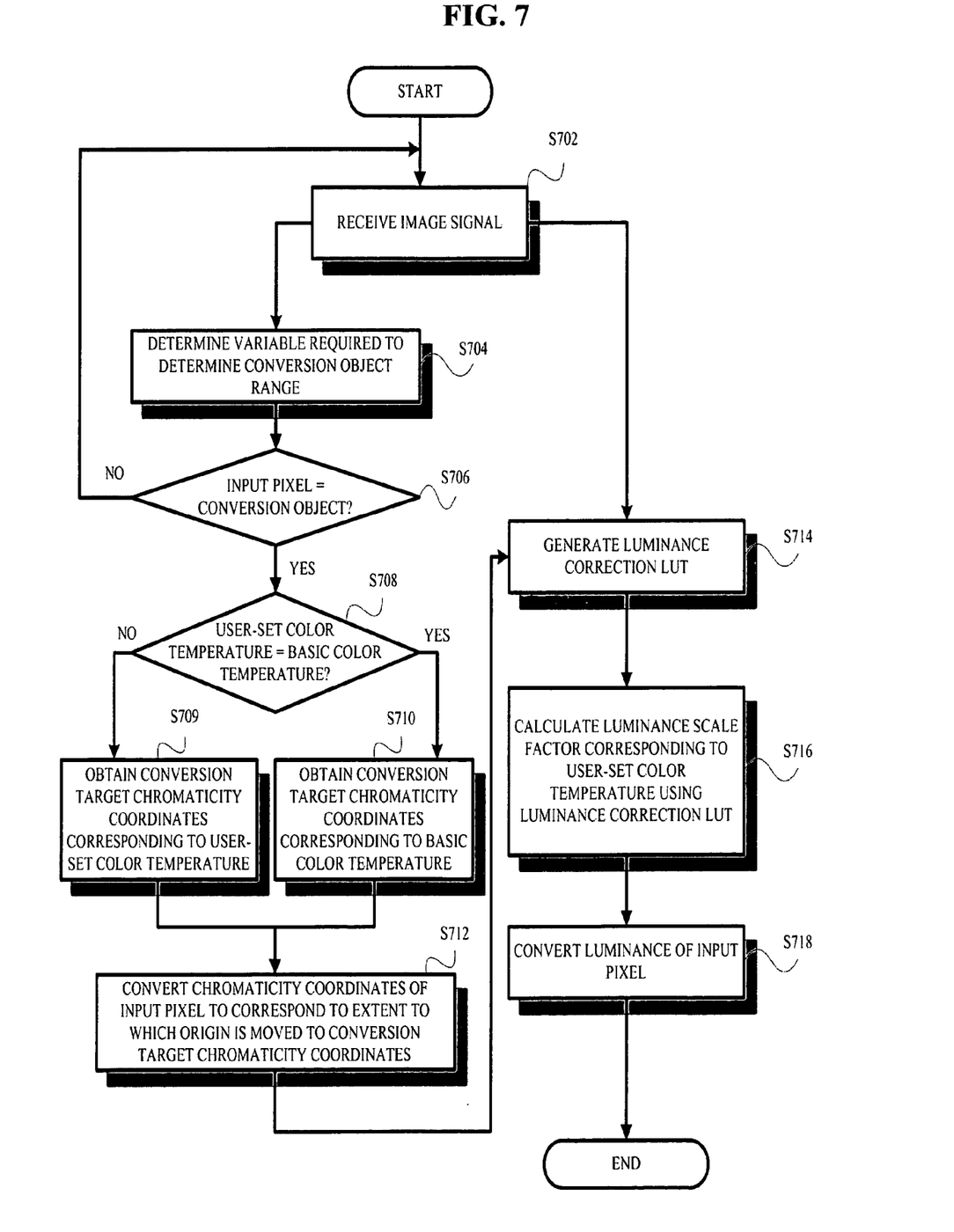
FIG. 7 is a flowchart showing a color temperature conversion method having a luminance correction conversion function according to an exemplary embodiment of the present invention.

FIG. 7 is a flowchart showing a color temperature conversion method having a luminance correction conversion function according to an exemplary embodiment of the present invention. According to the exemplary embodiment of the present invention, the color temperature conversion method controls the color temperature of an image display device, and includes the operation of comparing a user-set color temperature with a pre-stored basic color temperature for each sample luminance and then converting the color temperature of an input pixel, and the operation of calculating a luminance scale factor corresponding to the user-set color temperature with respect to the converted input pixel and performing a luminance correction conversion function using the calculated luminance scale factor. In this case, the luminance correction conversion function may be performed with respect to an input pixel, the color temperature of which is converted. Alternatively, after input image signals have been simultaneously received and a luminance correction conversion function has been performed as the operation to be performed simultaneously with the color temperature conversion operation, the chromaticity coordinates of the input pixel, the color temperature of which is converted, and the input pixel, the luminance of which is corrected and converted, can be combined with each other and then output. Respective detailed operations are described below.

First, the operation of converting the color temperature of an input pixel is described. If an image signal composed of a luminance signal Y and chrominance signals Cb and Cr has been received at operation S702, information is retrieved from a storage unit, storing a variable required to determine the conversion object range and control factors, and the variable required to determine the conversion object range corresponding to a predetermined pixel is determined at operation S704. If the conversion object range is an elliptical region, the determination variable can be composed of the length a of the major axis of the elliptical region, a control factor thereof, the length b of the minor axis of the elliptical region, a control factor thereof, a rotation angle of the major axis with respect to an X axis, a luminance scale factor, etc.

Further, the conversion object determination unit 110 determines whether the input pixel is a conversion object by determining whether the input pixel exists within the conversion object range on the basis of the determination variable at operation S706. In the exemplary embodiment of the present invention, since the conversion object range is set to an ellipse, whether coordinate values, obtained by rotating the coordinates of the input pixel, exist within the elliptical region is determined using equations.

If it is determined that the input pixel exists within the elliptical region and is a conversion object, the comparison unit 120 receives a user-set color temperature $T_u$ and the basic color temperature $T_w$ of an image display device, and compares the color temperatures $T_u$ and $T_w$ with each other at operation S708. The user-set color temperature is a value received from outside the color temperature conversion apparatus, and the basic color temperature is a value stored in the storage unit of the color temperature conversion unit 100. The LUT 310 containing chromaticity coordinates corresponding to a basic color temperature for each luminance can function as the storage unit for the basic color temperatures.

If the user-set color temperature $T_u$ is different from the basic color temperature $T_w$ as a result of the comparison, conversion target chromaticity coordinates corresponding to the user-set color temperature $T_u$ are obtained at operation S709. If the user-set color temperature $T_u$ is equal to the basic color temperature $T_w$, conversion target chromaticity coordinates corresponding to the basic color temperature $T_w$ are obtained at operation S710.

The operation S709 of obtaining the conversion target chromaticity coordinates corresponding to the user-set color temperature $T_u$ is performed so that the conversion target chromaticity coordinate operation unit 130 calculates conversion target chromaticity coordinates corresponding to the luminance signal and the chrominance signals of a current processing target pixel, with reference to the LUT 320, containing chromaticity coordinates corresponding to a color temperature for each sample luminance, and the user-set color temperature $T_u$. The operation S710 of obtaining the conversion target chromaticity coordinates corresponding to the basic color temperature $T_w$ when the user-set color temperature $T_u$ is equal to the basic color temperature $T_w$ is performed so that the conversion target chromaticity coordinate operation unit 130 calculates conversion target chromaticity coordinates corresponding to the luminance signal and chrominance signals of a current processing target pixel, with reference to the LUT 310, containing chromaticity coordinates corresponding to a basic color temperature for each luminance.

The chromaticity coordinate conversion unit 140 converts the chromaticity coordinates of the input pixel to correspond to the extent to which an origin on a chromaticity coordinate plane is moved to the conversion target chromaticity coordinates at operation S712.

Figure 8:
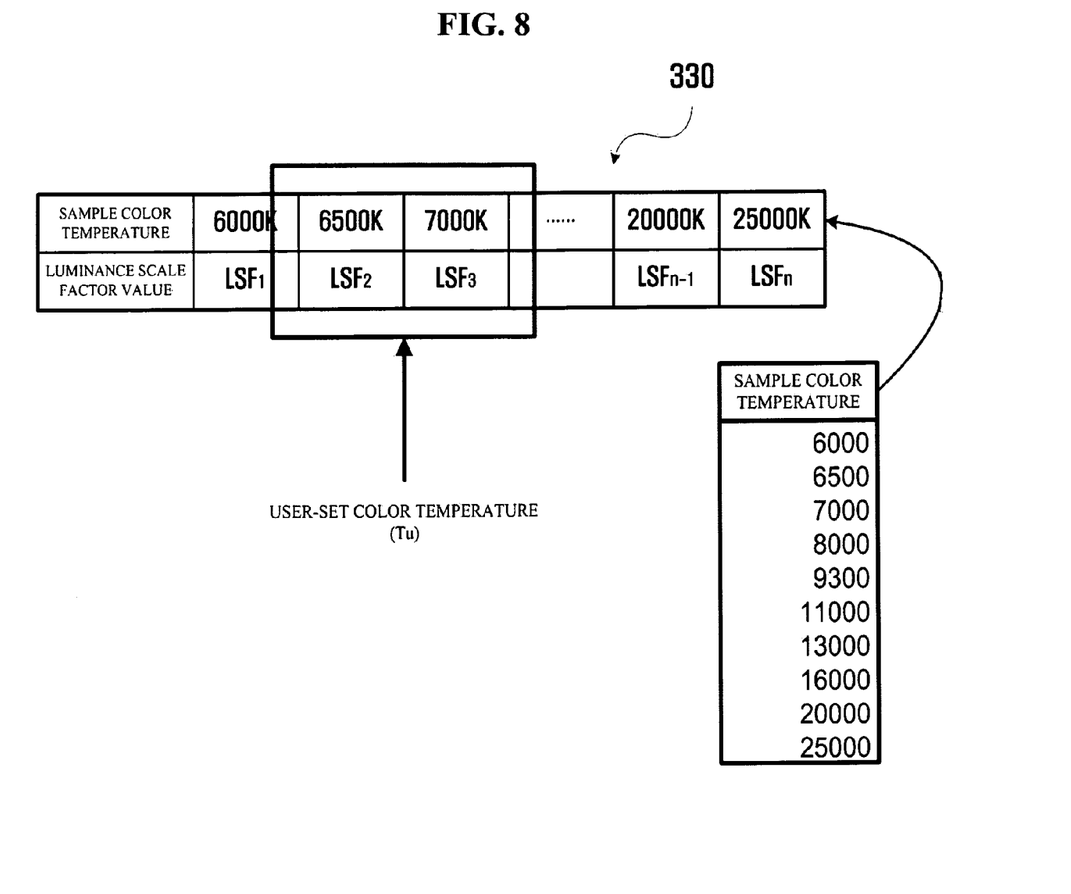
FIG. 8 is a diagram showing a luminance correction look-up table in the color temperature conversion method having a luminance correction conversion function according to an exemplary embodiment of the present invention.

Thereafter, the look-up table generation unit 210 of the luminance correction conversion unit 200 designates predetermined sample color temperatures and luminance scale factor values corresponding thereto, thus generating the luminance correction look-up table at operation S714. Alternatively, the look-up table generation unit 210 can generate a luminance correction look-up table simultaneously with the performance of operations S704 to S712, instead of generating the luminance correction look-up table after operation S712 has been performed. An example of such a luminance correction look-up table is shown in FIG. 8. FIG. 8 illustrates a luminance correction look-up table according to an exemplary embodiment of the present invention. In an upper portion of the table, sample color temperatures, in particular, sample color temperatures preset by the user, are arranged for respective temperatures. In a lower portion of the table, pre-designated luminance scale factor values corresponding to the sample color temperatures are arranged.

The luminance scale factor calculation unit 220 calculates a luminance scale factor corresponding to the user-setting color temperature using the luminance correction look-up table 330 at operation S716. In this case, it is also possible to omit the operation S714 of generating a luminance correction look-up table and to calculate a luminance scale factor using a luminance correction look-up table, previously generated by a manufacturer.

An exemplary procedure of calculating the luminance scale factor using the luminance correction LUT 330 is described with reference to FIG. 8. It is assumed that when the user-set color temperature is $T_u$, the user-set color temperature $T_u$ has a value greater than 6500K and equal to or less than 7000K (that is, 6500K<$T_u$≦7000K). Then, since only 6500K and 7000K are shown in the luminance correction LUT 330, a luminance scale factor must be estimated through interpolation using weighting values. This estimation is expressed by the following Equations 5 through 7.

$$Wt6500 = (7000K - T_u)/(7000K - 6000K), \text{(weighting value for 6500K)} \quad (5)$$

$$Wt7000 = (T_u - 6500K)/(7000K - 6000K), \text{(weighting value for 7000K)} \quad (6)$$

$$LSF = Wt6500 * LSF_2 + Wt7000 * LSF_3 \quad (7)$$

Figure 6:
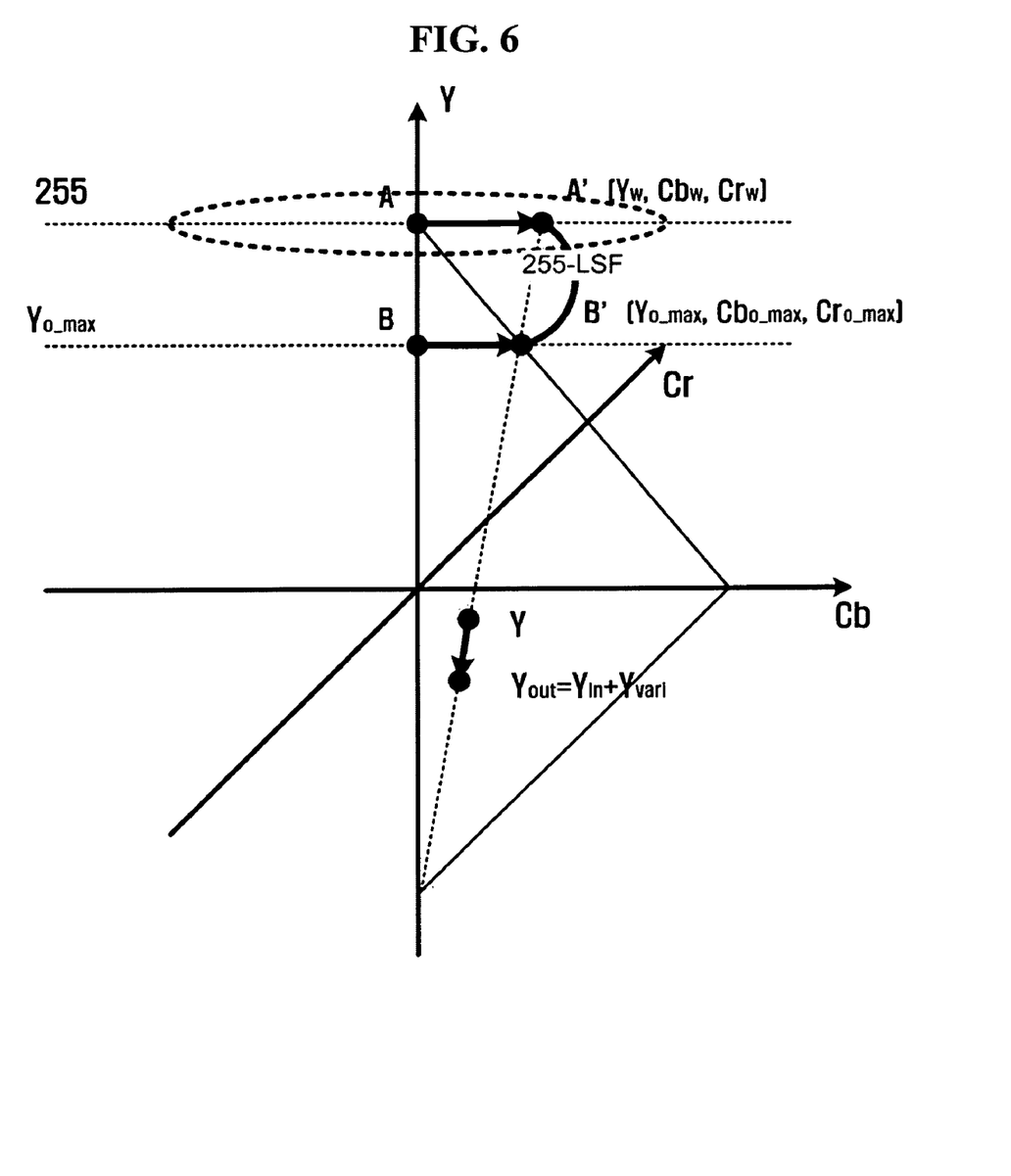
FIG. 6 is a diagram showing a procedure of performing a luminance correction conversion function in a YCbCr color space according to an exemplary embodiment of the present invention.

The luminance conversion unit 230 adds the luminance value of the input pixel corresponding to the region, determined to be the color temperature conversion object range, to the amount of luminance correction using the luminance scale factor, thus converting the luminance of the input pixel at operation S718. This procedure is described in detail with reference to FIG. 6. FIG. 6 is a diagram showing a procedure of performing a luminance correction conversion function in a YCbCr color space according to an exemplary embodiment of the present invention. In FIG. 6, the vertical axis of a three-dimensional space denotes an axis indicating a Y value, and point A denotes a white value having a luminance of 255. Point A' denotes a point obtained by converting the color temperature of the point A using the color temperature conversion unit 100. Since the point A' deviates from a color gamut, it cannot be represented. Accordingly, if the point A' is rescaled and mapped, the point A' is moved to point B'. That is, as described above with reference to the prior art, colors having different luminance values subsequently have the same luminance due to color temperature conversion, thus causing a problem in which distortion occurs in gray scale representation. Therefore, the present invention performs luminance correction by adding the luminance value of the input pixel corresponding to the region, determined to be a color temperature conversion object range, to the amount of luminance correction using an LSF, without using a method of mapping only colors that deviate from a color space to the inside of the color space.

The amount of luminance correction can be obtained through several methods, for example, the following Equation 8.

$$\alpha = 1 - (p_{1x}^2/a^2 + p_{1y}^2/b^2)^{0.5}$$

$$y_{vari} = (y_{in}/255) * (LSF - 255) * \alpha$$

$$y_{out} = y_{in} + y_{vari} \quad (8)$$

In this case, a is the length of the main axis of an elliptical region determined to be a color temperature conversion object range, b is the length of the minor axis of the elliptical region, $p_{1x}$ and $p_{1y}$ are x and y components of the rotated coordinates $P_1(p_{1x}, p_{1y})$ of coordinates P(x, y) of the input pixel, LSF is a luminance scale factor, $y_{in}$ is the luminance value of the input pixel, $y_{vari}$ is the amount of luminance correction, and $y_{out}$ is the luminance value of the pixel obtained after the luminance correction conversion function has been performed. Further, α is a parameter indicating the distance by which the input color is spaced apart from the center of the elliptical region. If the parameter α exists on the boundary of the elliptical region, the parameter α is 0, so that the amount of luminance correction $y_{vari}$ does not exist. However, if the parameter α is 1, the input color exists in the center of the elliptical region, so that the amount of luminance correction $y_{vari}$ depends only upon the difference between the LSF and 255, that is, LSF–255. As shown in FIG. 6, the difference LSF–255 between the LSF and 255 signifies the luminance difference between A' and B'. That is, as the luminance difference between A' and B' increases, the amount of luminance correction also increases in proportion to the increase of the luminance difference, whereas, as the luminance difference decreases, the amount of luminance correction also decreases in proportion to the decrease of the luminance difference.

The amount of luminance correction can be implemented using various methods other than the method using Equation 8, for example, the following Equation 9, $$y_{vari} = (y_{in}/255) * (LSF - 255) * \alpha^n \quad (9)$$

where n is an integer.

Luminance correction can be performed on all luminance values Y, but correction of luminance values Y deteriorates the luminance values Y as a whole, so that an image becomes slightly dark depending on the conversion of color temperature. In this case, luminance correction can be performed only on luminance values Y that exceed a predetermined threshold value, without decreasing the luminance value Y up to the threshold value. Therefore, the luminance correction conversion function can be performed so that, if an input luminance value is greater than the threshold value ($y_{in} > y_{th}$), the amount of luminance correction is calculated using the following Equations 10 and 11, whereas, if the input luminance value is equal to or less than the threshold value ($y_{in} \leq y_{th}$), $y_{vari}=0$ is obtained.

$$y_{vari} = \{(y_{in}-y_{th})/(255-y_{th})\} * (LSF-255) * \alpha \qquad (10)$$

$$y_{vari} = \{(y_{in}-y_{th})/(255-y_{th})\} * (LSF-255) * \alpha^n \qquad (11)$$

Figure 9:
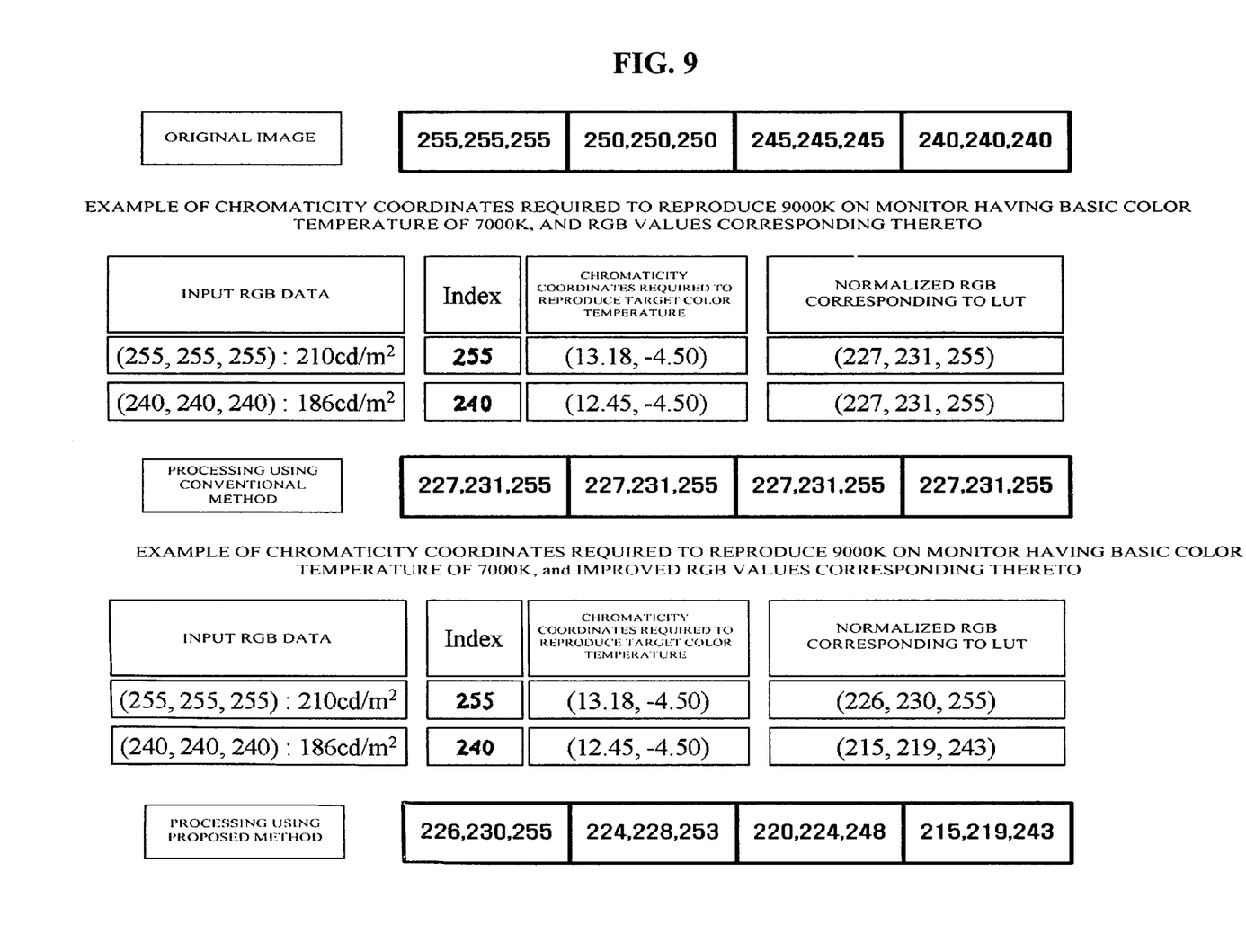
FIG. 9 is a diagram showing an example of an improvement realized when the color temperature conversion method having a luminance correction conversion function according to an exemplary embodiment of the present invention is implemented.

Meanwhile, FIG. 9 is a diagram showing an example of an improvement realized when the color temperature conversion method having a luminance correction conversion function according to an exemplary embodiment of the present invention is implemented. Chromaticity coordinates, required to reproduce 9000K on a monitor having a basic color temperature of 7000K, and RGB values corresponding to the chromaticity coordinates are shown. Input RGB values (gray values ranging from [240, 240, 240] to [255, 255, 255]) having different luminance values according to related art color temperature conversion) are equally represented by normalized RGB values (227, 231, 255). This means that gray values ranging from (240, 240, 240) to (255, 255, 255) are shown differently in an input image, but they are shown as the same luminance in an output image. However, according to the luminance correction method proposed in the present invention, when input values differ, output values are also mapped to different values, like values (215, 219, 243) to (226, 230, 255). Accordingly, if input values are differently shown in an input image, output values are also differently shown in an output image.

It is apparent to those skilled in the art that the scope of the present invention includes a computer-executable program product, including the operations required to perform the above-described color temperature conversion method having a luminance correction conversion function, and a computer-readable recording medium thereof.

The term 'unit', as used herein, that is, "module" or "table" means, but is not limited to, a software or hardware component, such as a Field Programmable Gate Array (FPGA) or Application Specific Integrated Circuit (ASIC), which performs certain tasks. A module may advantageously be configured to reside on the addressable storage medium and may be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or may be further separated into additional components and modules. In addition, the components and the modules can be implemented to execute one or more Central Processing Units (CPUs) in a device or security multimedia card.

Accordingly, a color temperature conversion method and apparatus having a luminance correction conversion function of the exemplary embodiments of the present invention is advantageous in that it corrects luminance using a preset luminance scale factor (LSF), thus preventing distorted gray scale representation that may occur in the conversion and correction of color temperature.

The advantages of the present invention are not limited to the above-described advantages, but other advantages, not described, will be undoubtedly understood by those skilled in the art from the description of the accompanying claims.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Therefore, it should be understood that the above exemplary embodiments are only exemplary, but are not limited.

The scope of the present invention is represented by the scope of the accompanying claims, rather than the detailed description. All changes or modifications derived from the meaning and scope of the claims and equivalent concepts thereof should be interpreted as being included in the scope of the present invention.

What is claimed is:

1. A color temperature conversion method having a luminance correction conversion function, the method comprising:
   converting a color temperature of an input pixel corresponding to a region which is determined to be a color temperature conversion object range by comparing a user-set color temperature with a pre-stored basic color temperature for each sample luminance;
   calculating a luminance scale factor corresponding to the user-set color temperature with respect to the converted input pixel; and
   performing luminance correction conversion for the converted input pixel using the calculated luminance scale factor.

2. The color temperature conversion method of claim 1, further comprising combining chromaticity coordinates of the input pixel, the color temperature of which is converted, and the input pixel, the luminance of which is corrected and converted.

3. The color temperature conversion method of claim 2, wherein the converting the color temperature of the input pixel comprises:
   determining a variable required to determine a conversion object range, which is a quadratic curve;
   determining whether the input pixel is a conversion object by determining whether the input pixel exists within the conversion object range, based on the variable;
   receiving the user-set color temperature and comparing the user-set color temperature with the basic color temperature if it is determined that the input pixel is the conversion object;
   obtaining conversion target chromaticity coordinates corresponding to the user-set color temperature if it is determined that the user-set color temperature is different from the basic color temperature;
   obtaining conversion target chromaticity coordinates corresponding to the basic color temperature if it is determined that the user-set color temperature is equal to the basic color temperature; and
   converting chromaticity coordinates of the input pixel to correspond to an extent to which an origin on a chromaticity coordinate plane is moved to the conversion target chromaticity coordinates.

4. The color temperature conversion method of claim 2, wherein the performing the luminance correction conversion comprises:
    designating predetermined sample color temperatures and luminance scale factor values corresponding thereto to generate a luminance correction look-up table;
    calculating a luminance scale factor corresponding to the user-set color temperature using the luminance correction look-up table; and
    adding a luminance of the input pixel corresponding to a region, which is determined to be a color temperature conversion object range, to an amount of luminance correction using the luminance scale factor, to convert the luminance of the input pixel.

5. The color temperature conversion method of claim 2, wherein the performing the luminance correction conversion comprises:
    calculating a luminance scale factor corresponding to the user-set color temperature using a previously generated luminance correction look-up table; and
    adding a luminance of the input pixel corresponding to a region, determined to be a color temperature conversion object range, to an amount of luminance correction using the luminance scale factor, to convert the luminance of the input pixel.

6. The color temperature conversion method of claim 5, wherein the amount of luminance correction is calculated using the following equations, $$\alpha = 1 - (p_{1x}^2/a^2 p_{1y}^2/b^2)^{0.5}$$

$$y_{vari} = (y_{in}/255) * (LSF-255) * \alpha$$

$$y_{out} = y_{in} + y_{vari}$$

wherein a is a length of a main axis of an elliptical region, which is determined to be the color temperature conversion object range, b is a length of a minor axis of the elliptical region, $p_{1x}$ and $p_{1y}$ are x and y components of rotated coordinates $P_1(p_{1x}, p_{1y})$ of coordinates $P(x, y)$ of the input pixel, LSF is the luminance scale factor, $y_{in}$ is the luminance of the input pixel, $y_{vari}$ is the amount of luminance correction, $y_{out}$ is a luminance of the pixel obtained after the luminance correction conversion has been performed, and $\alpha$ is a parameter indicating a distance by which an input color is spaced apart from a center of the elliptical region.

7. The color temperature conversion method of claim 6, wherein the amount of luminance correction is calculated using the following equation, $$y_{vari} = (y_{in}/255) * (LSF-255) * \alpha^n$$

wherein n is an integer.

8. The color temperature conversion method of claim 6, wherein if $y_{in} > y_{th}$, the amount of luminance correction is calculated using the following equation, $$y_{vari} = \{(y_{in}-y_{th})/(255-y_{th})\} * (LSF-255) * \alpha \text{ (original)}:$$

wherein $y_{th}$ denotes a threshold value for luminance, and the amount of luminance correction $y_{vari}$ is 0 if $y_{in} \leq y_{th}$.

9. The color temperature conversion method of claim 7, wherein if $y_{in} > y_{th}$, the amount of luminance correction is calculated using the following equation, $$y_{vari} = \{(y_{in}-y_{th})/(255-y_{th})\} * (LSF-255) * \alpha^n \text{ (original)}:$$

wherein $y_{th}$ denotes a threshold value for luminance, and the amount of luminance correction $y_{vari}$ is 0 when $y_{in} \leq y_{th}$.

10. A non-transitory computer-readable medium on which is recorded a computer-executable program for executing a color temperature conversion method having a luminance correction conversion function, the method comprising:
    converting a color temperature of an input pixel corresponding to a region which is determined to be a color temperature conversion object range by comparing a user-set color temperature with a pre-stored basic color temperature for each sample luminance; and
    calculating a luminance scale factor corresponding to the user-set color temperature with respect to the converted input pixel; and
    performing a luminance correction conversion for the converted input pixel using the calculated luminance scale factor.

11. A color temperature conversion apparatus having a luminance correction conversion function, the color temperature conversion apparatus comprising:
    a color temperature conversion unit which converts a color temperature of an input pixel corresponding to a region which is determined to be a color conversion object range by comparing a user-set color temperature with a pre-stored basic color temperature for each sample luminance; and
    a luminance correction conversion unit which calculates a luminance scale factor corresponding to the user-set color temperature with respect to the converted input pixel, and performs luminance correction conversion for the converted input pixel using the calculated luminance scale factor.

12. The color temperature conversion apparatus of claim 11, wherein the luminance correction conversion unit calculates the luminance scale factor corresponding to the user-set color temperature with respect to the input pixel, the color temperature of which is converted by the color temperature conversion unit, and performs the luminance correction conversion using the calculated luminance scale factor.

13. The color temperature conversion apparatus of claim 11, wherein the color temperature conversion unit comprises:
    a conversion object determination unit which determines whether an input pixel of an image signal is a color temperature conversion object;
    a comparison unit which compares the user-set color temperature with the basic color temperature to selectively obtain conversion target chromaticity coordinates corresponding to one of the user-set color temperature and the basic color temperature if it is determined that the input pixel of the image signal is a color temperature conversion object as a result of the determination of the conversion object determination unit;
    a conversion target chromaticity coordinate operation unit which selectively obtains conversion target chromaticity coordinates corresponding to one of the user-set color temperature and the basic color temperature, based on a result of the comparison of the comparison unit; and
    a chromaticity coordinate conversion unit which converts chromaticity coordinates of the input pixel to correspond to an extent to which the conversion target chromaticity coordinates are moved to an origin.

14. The color temperature conversion apparatus of claim 11, wherein the luminance correction conversion unit comprises:
    a look-up table generation unit which designates predetermined sample color temperatures and luminance scale factor values corresponding to generate a luminance correction look-up table;

a luminance scale factor calculation unit which calculates a luminance scale factor corresponding to the user-set color temperature using the luminance correction look-up table; and a luminance conversion unit which adds a luminance of the input pixel corresponding to a region, which is determined to be a color temperature conversion object range, to an amount of luminance correction using the luminance scale factor, to convert the luminance of the input pixel.

15. The color temperature conversion apparatus of claim 11, wherein the luminance correction conversion unit comprises:

a luminance scale factor calculation unit which calculates a luminance scale factor corresponding to the user-set color temperature using a previously generated luminance correction look-up table; and a luminance conversion unit which adds a luminance of the input pixel corresponding to a region, which is determined to be a color temperature conversion object range, to an amount of luminance correction using the luminance scale factor, to convert the luminance of the input pixel.

16. The color temperature conversion apparatus of claim 15, wherein the amount of luminance correction is calculated using the following equations, $$\alpha = 1 - (p_{1x}^2/a^2 + p_{1y}^2/b^2)^{0.5}$$

$$y_{vari} = (y_{in}/255) * (LSF - 255) * \alpha$$

$$y_{out} = y_{in} + y_{vari}$$

wherein a is a length of a main axis of an elliptical region, determined to be the color temperature conversion object range, b is a length of a minor axis of the elliptical region, $p_{1x}$ and $p_{1y}$ are x and y components of rotated coordinates $P_1(p_{1x}, p_{1y})$ of coordinates $P(x, y)$ of the input pixel, LSF is the luminance scale factor, $y_{in}$ is the luminance of the input pixel, $y_{vari}$ is the amount of luminance correction, $y_{out}$ is a luminance of the pixel obtained after the luminance correction conversion has been performed, and $\alpha$ is a parameter indicating a distance by which an input color is spaced apart from a center of the elliptical region.

17. The color temperature conversion apparatus of claim 16, wherein the amount of luminance correction is calculated using the following equation, $$y_{vari} = (y_{in}/255) * (LSF - 255) * \alpha^n$$

wherein n is an integer.

18. The color temperature conversion apparatus of claim 16, wherein if $y_{in} > y_{th}$, the amount of luminance correction is calculated using the following equation, $$y_{vari} = \{(y_{in} - y_{th})/(255 - y_{th})\} * (LSF - 255) * \alpha$$

wherein $y_{th}$ denotes a threshold value for luminance, and the amount of luminance correction $y_{vari}$ is 0 when $y_{in} \leq y_{th}$.

19. The color temperature conversion apparatus of claim 17, wherein if $y_{in} > y_{th}$, the amount of luminance correction is calculated using the following equation, $$y_{vari} = \{(y_{in} - y_{th})/(255 - y_{th})\} * (LSF - 255) * \alpha^n$$

wherein $y_{th}$ denotes a threshold value for luminance, and the amount of luminance correction $y_{vari}$ is 0 if $y_{in} \leq y_{th}$.

* * * * *